(12) United States Patent
Wood et al.

(10) Patent No.: US 9,011,027 B2
(45) Date of Patent: Apr. 21, 2015

(54) CAMERA SUPPORT DEVICE INCLUDING JIB ARM

(71) Applicants: Dennis Wood, Thunder Bay (CA); Tyler J. F. Bragnalo, Kaministiquia (CA)

(72) Inventors: Dennis Wood, Thunder Bay (CA); Tyler J. F. Bragnalo, Kaministiquia (CA)

( * ) Notice: Subject to any disclaimer, the term of this patent is extended or adjusted under 35 U.S.C. 154(b) by 40 days.

(21) Appl. No.: 13/766,352

(22) Filed: Feb. 13, 2013

(65) Prior Publication Data

US 2013/0209085 A1  Aug. 15, 2013

Related U.S. Application Data

(60) Provisional application No. 61/598,089, filed on Feb. 13, 2012.

(51) Int. Cl.
| | | |
|---|---|---|
| G03B 17/00 | (2006.01) | |
| F16M 11/04 | (2006.01) | |
| F16M 11/18 | (2006.01) | |
| F16M 11/10 | (2006.01) | |
| F16M 11/20 | (2006.01) | |
| F16M 11/24 | (2006.01) | |

(52) U.S. Cl.
CPC ............. *F16M 11/043* (2013.01); *F16M 11/18* (2013.01); *F16M 11/10* (2013.01); *F16M 11/2064* (2013.01); *F16M 11/2092* (2013.01); *F16M 11/24* (2013.01); *F16M 2200/044* (2013.01); *F16M 2200/063* (2013.01)

(58) Field of Classification Search
USPC .......................................... 396/428, 419–422
See application file for complete search history.

(56) References Cited

U.S. PATENT DOCUMENTS

| | | | |
|---|---|---|---|
| 5,033,705 | A | 7/1991 | Reagan |
| 5,531,412 | A * | 7/1996 | Ho .............................. 248/123.2 |
| 6,752,541 | B1 | 6/2004 | Dykyj |
| D588,621 | S | 3/2009 | Baty |
| 8,006,850 | B2 | 8/2011 | Rotheisler |
| 2006/0147196 | A1 | 7/2006 | Hein et al. |

* cited by examiner

*Primary Examiner* — Rochelle-Ann J Blackman
(74) *Attorney, Agent, or Firm* — Ryan W. Dupuis; Kyle R. Satterthwart; Ade & Company Inc.

(57) ABSTRACT

A camera supporting device includes a jib arm supporting a camera mount for panning and tilting movement relative to a base structure. A parallel linkage couples the camera mount at one end of the jib arm to the base structure pivotally supporting the jib arm thereon at an intermediate location. The jib arm is readily separable into two portions for storage with the parallel linkage being wholly contained within a hollow tubular member forming one of the two portions while an adjustable trim weight and counterweight support are supported on the other portion. Interchangeable indexing rings permit indexing of the panning or tilting movements.

20 Claims, 10 Drawing Sheets

CAMERA SUPPORT DEVICE INCLUDING JIB ARM

This application claims the benefit under 35 U.S.C. 119(e) of U.S. provisional application Ser. No. 61/598,089, filed Feb. 13, 2013.

FIELD OF THE INVENTION

The present invention relates to a camera support device including a jib arm pivoted relative to base, a camera mount pivotal on the jib arm, and a parallel link type linkage such that angular orientation of the camera mount relative to the jib arm varies corresponding to pivotal movement of the jib arm relative to the base.

BACKGROUND

A tool commonly used in the film industry is a camera support including a jib arm. A camera mount is pivotally supported at one end of the jib arm and a counterbalance weight is typically supported at the other end of the jib arm with the jib arm being centrally pivoted on a base structure such as a dolly or a tripod. A parallel-type linkage is typically connected between the base structure and the camera mount such that angular orientation of the camera mount relative to the jib arm varies corresponding to pivotal movement of the jib arm relative to the base structure.

Examples of various configures of jib arms are disclosed in the following: U.S. Pat. No. D588,621 by Baty, U.S. Pat. No. 5,033,705 by Reagan, U.S. Pat. No. 8,006,850 by Rotheisler, and U.S. Pat. No. 6,752,541 by Dykyj, and US Patent Application Publication 2006/0147,196 by Hein et al. In each instance a complex arrangement of external linkage components are provided such that the jib arms are not well suited for ease of disassembly or portability without considerable time consuming disassembly and reassembly being required. Furthermore, the external configuration of the various adjustment features results in a construction which lacks durability.

SUMMARY OF THE INVENTION

According to one aspect of the invention there is provided a camera supporting device for supporting a camera for movement through an arc-shaped path relative to a base structure, the device comprising:

a base mount arranged for connection to the base structure;

a camera mount arranged for supporting the camera thereon;

a jib arm extending in a longitudinal direction between a camera end and a weighted end; and a linkage connecting the camera mount to the base mount, the linkage comprising:

a first axle pivotally coupled to the jib arm adjacent the camera end for relative pivotal movement about a first axis and being coupled to the camera mount in fixed relation thereto;

a first pivot link fixed to the first axle for pivotal movement therewith relative to the jib arm;

a second axle fixed to the base mount and pivotally supporting the jib arm thereon about a second axis parallel to the first axis;

a second pivot link fixed to the second axle; and a rod member pivotally coupled at a first end on the first pivot link spaced from the first axle and pivotally coupled at a second end of the second pivot link spaced from the second axle so as to be in parallel relationship with the jib arm such that the camera mount is pivotal relative to the jib arm corresponding to pivotal movement of the jib arm relative to the base structure;

wherein the jib arm comprises a tubular member; and wherein the first pivot link, the second pivot link and the rod member are fully received within the tubular member forming the jib arm.

By providing a jib arm in the form of a tubular member which includes a camera portion fully receiving the linkage therein and a balance portion which is separable from the camera portion, the resulting jib arm is easily disassembled for ease of portability and transport. Furthermore the jib arm is durable in construction due to the linkage being contained within the respective camera portion.

Preferably the rod member comprises a first parallel rod and the linkage further includes a second parallel rod in which the first and second parallel rods are pivotally coupled at opposing ends on the first and second pivot links respectively at diametrically opposed locations relative to the respective axles.

The device may further include a brake disc fixed on the jib arm for pivotal movement therewith relative to the base mount and a brake member supported on the base mount so as to be arranged for adjustably engaging the brake disc to apply a braking force resisting pivotal movement of the jib arm relative to the base mount. The brake member may include a screw member arranged to apply an adjustable braking force to resist pivotal movement of the jib arm relative to the base mount.

When there is provided a trim weight supported on the jib arm in proximity to the weighted end for sliding movement relative to the jib arm in the longitudinal direction, the trim weight may further comprise a collar supported about the jib arm which is arranged to be selectively clamped about the jib arm to fix the trim weight relative to the jib arm.

Preferably the jib arm comprises: i) a camera portion extending in the longitudinal direction between a first end at the camera end of the jib arm and a second end, the camera portion fully supporting the linkage thereon such that the base axle is adjacent to the second end; and ii) a balance portion extending in the longitudinal direction between a first end coupled to the second end of the camera portion and a second end at the weighted end of the jib arm in which the balance portion fully supports a counterweight of the jib arm thereon. More preferably, the balance portion and counterweight supported thereon are readily separable from the camera portion and the linkage supported thereon.

The camera mount may further include a frame portion fixed to the camera axle and a bowl mount arranged to adjustably support a ball head therein. In this instance, the bowl mount is preferably arranged to be coupled to the frame portion in a plurality of different interlocked positions which are angularly offset from one another about an axis oriented parallel to the camera axle. Preferably a portion of the bowl mount is interlocked with a portion of the frame portion in each of the different interlocked positions.

The jib arm may include a bore extending therethrough adjacent to the weighted end which slidably receives a weight mounting post therein. In this instance, a clamp member is preferably mounted on the jib arm so as to be arranged to selectively retain the weight mounting post fixed to the jib arm in a working position for mounting weights thereon. The weight mounting post is preferably readily slidably removable from the bore in the jib arm when the clamp member is released.

The base mount may comprise: i) a first portion arranged to be fixed relative to the base structure, ii) a second portion which is rotatable relative to the first portion about an upright pan axis, iii) an indexing marker supported on one of the first and second portions, and iv) an indexing ring supported on the other one of the first and second portions concentrically with the upright pan for pivotal movement relative to the indexing marker. Preferably the indexing ring is magnetically retained on the respective portion of the base mount so as to be readily separable and interchangeable with another indexing ring of like configuration.

The may also be provided an indexing marker supported on one of the jib arm and the base mount and an indexing ring supported on the other one of the jib arm and the base mount concentrically with the second axle for pivotal movement relative to the indexing marker. Preferably this indexing ring is also magnetically retained on the respective one of the jib arm and the base mount so as to be readily separable and interchangeable with another indexing ring of like configuration. The indexing ring concentric with the second axle of the jib arm and the indexing ring concentric with the upright pan axis are preferably also interchangeable with one another.

According to a second aspect of the present invention there is provided a camera supporting device for supporting a camera for movement through an arc-shaped path relative to a base structure, the device comprising:

a base mount arranged for connection to the base structure;

a camera mount arranged for supporting the camera thereon;

a jib arm extending in a longitudinal direction between a camera end and a weighted end;

a linkage including a base axle pivotally supporting the jib arm on the base mount at an intermediate location between the camera end and the weighted end and a camera axle pivotally coupled to the jib arm adjacent the camera end and supporting the camera mount in fixed relation thereon, the linkage connecting the camera mount to the base mount such that the camera mount is pivotal relative to the jib arm corresponding to pivotal movement of the jib arm relative to the base mount; and a counterweight supported on the jib arm in proximity to the weighted end;

wherein the jib arm comprises:

a camera portion extending in the longitudinal direction between a first end at the camera end of the jib arm and a second end, the camera portion fully supporting the linkage thereon such that the base axle is adjacent to the second end; and a balance portion extending in the longitudinal direction between a first end coupled to the second end of the camera portion and a second end at the weighted end of the jib arm, the balance portion fully supporting the counterweight thereon; and wherein the balance portion and counterweight supported thereon are readily separable from the camera portion and the linkage supported thereon.

When one of the camera portion and the balance portion includes circumferentially spaced apart studs extending radially outward therefrom, preferably the other one of the camera portion and the balance portion includes circumferentially spaced apart generally L-shaped slots arranged to mating receive respective ones of the studs therein in a coupled position of the camera portion and the balance portion.

The portion locating the studs therein may further comprise a locking aperture arranged for alignment with one of the slots in the other portion in the coupled position so as to be arranged to receive a locking pin through locking aperture and corresponding slot to retain the jib arm in the coupled position.

The camera portion and the balance portion may each comprise an elongate tubular member in which the tubular members have a common diameter.

Preferably the linkage is wholly received within the tubular member of camera portion.

According to another aspect of the present invention there is provided a camera supporting device for supporting a camera for movement through an arc-shaped path relative to a base structure, the device comprising:

a base mount arranged for connection to the base structure;

a camera mount arranged for supporting the camera thereon;

a jib arm extending in a longitudinal direction between a camera end and a weighted end;

a linkage including a base axle pivotally supporting the jib arm on the base mount at an intermediate location between the camera end and the weighted end and a camera axle pivotally coupled to the jib arm adjacent the camera end and supporting the camera mount in fixed relation thereon, the linkage connecting the camera mount to the base mount such that the camera mount is pivotal relative to the jib arm corresponding to pivotal movement of the jib arm relative to the base mount; and a counterweight supported on the jib arm in proximity to the weighted end;

wherein the camera mount includes a frame portion fixed to the camera axle and a bowl mount arranged to adjustably support a ball head therein;

wherein the bowl mount is arranged to be coupled to the frame portion in a plurality of different interlocked positions which are angularly offset from one another about an axis oriented parallel to the camera axle; and wherein a portion of the bowl mount is interlocked with a portion of the frame portion in each of the different interlocked positions.

The interlocking configuration of the bowl mount and frame portion in each of the different positions provides positive support to the bowl mount and the weight of a camera supported thereon while remaining adjustable.

Preferably the frame portion comprises a pair of arms fixed to the camera axle at opposing ends thereof and the bow mount comprises a pair of diametrically opposed protrusions arranged to be interlocked with respective ones of the arms in the different interlocked positions.

Preferably the axis about which bowl mount is angularly adjustable extends through the diametrically opposed protrusions.

Preferably the protrusions have a first shape and wherein sockets are provided on the arms having a second shape arranged to matingly receive the first shape therein in each of the different interlocked positions which are angularly offset from one another.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
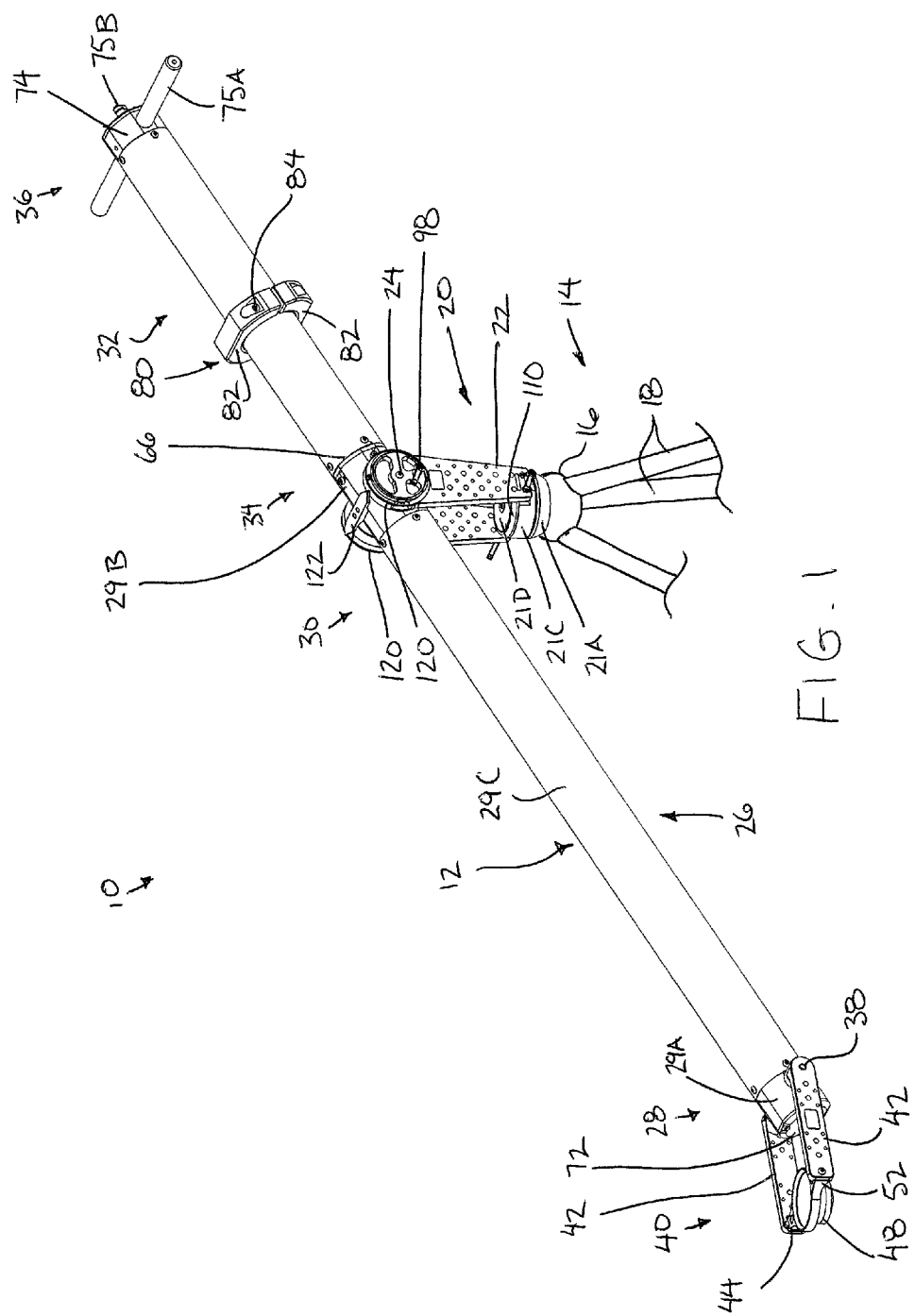
FIG. 1 is a perspective view of the camera support device.
Figure 2:
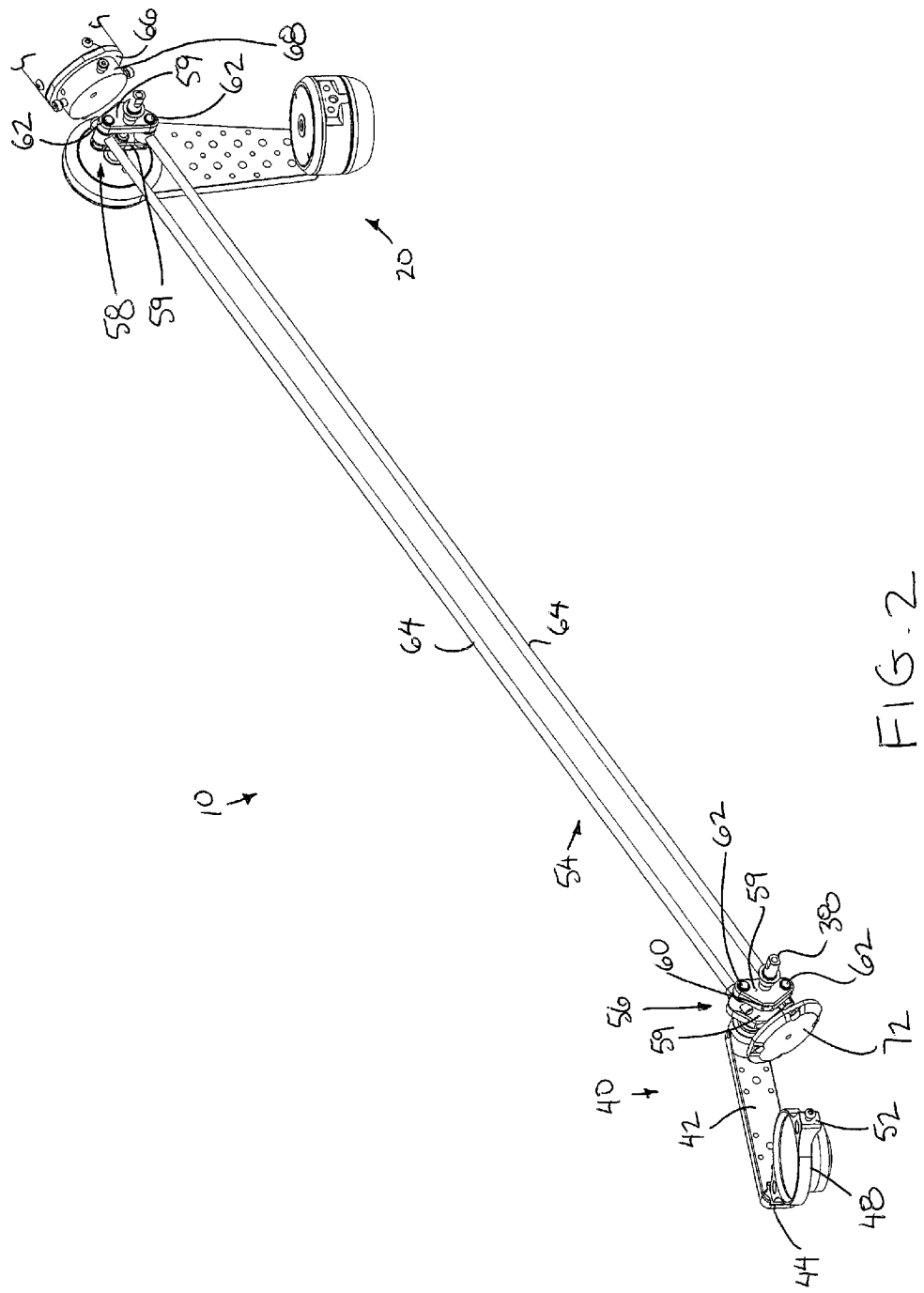
FIG. 2 is a perspective view of linkage within the camera portion of the jib arm with the camera portion of the jib arm shown removed.
Figure 3:
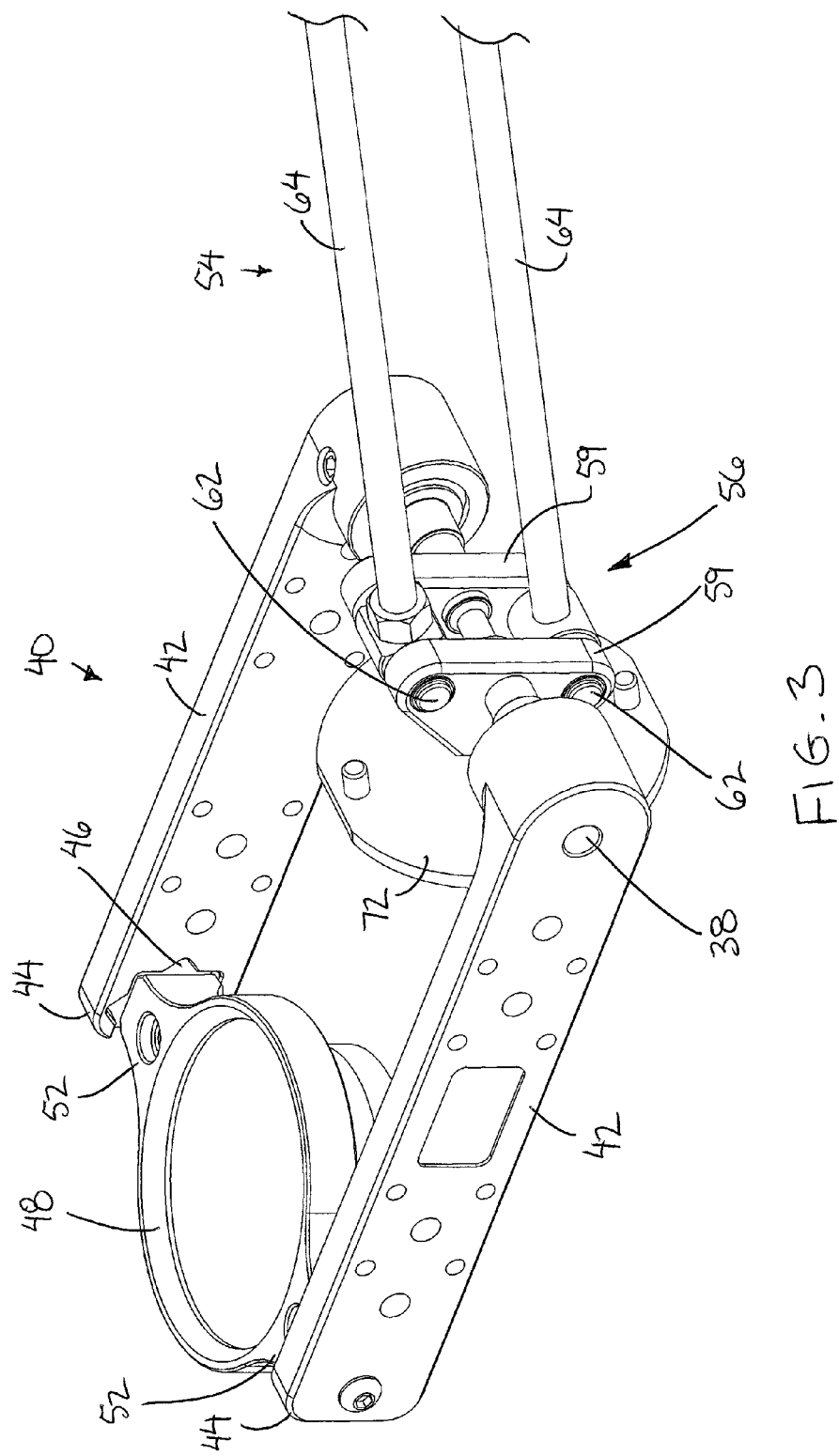
FIG. 3 is a perspective view of the connection of the linkage to the camera axle with the camera portion of the jib arm shown removed.
Figure 4:
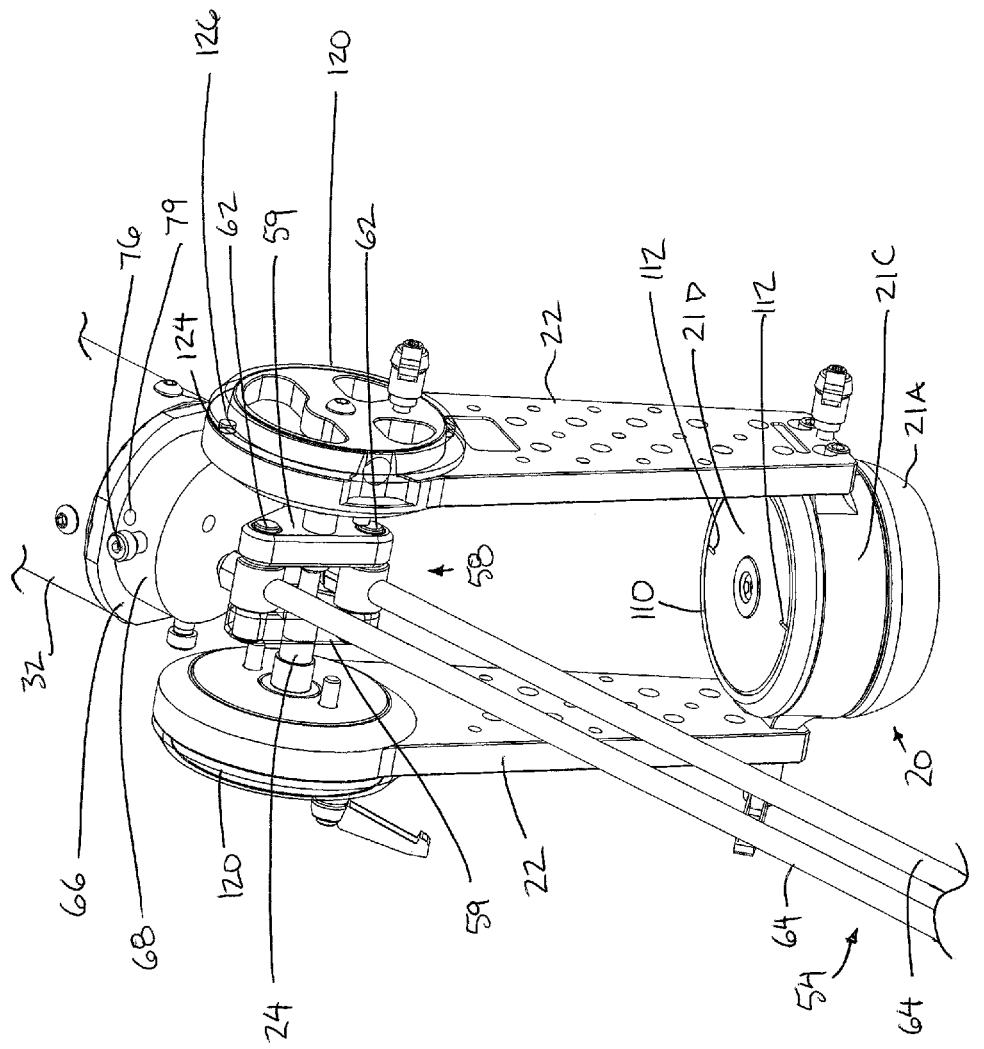
FIG. 4 is a perspective view of the connection of the linkage to the base axle with the camera portion of the jib arm shown removed.
Figure 5:
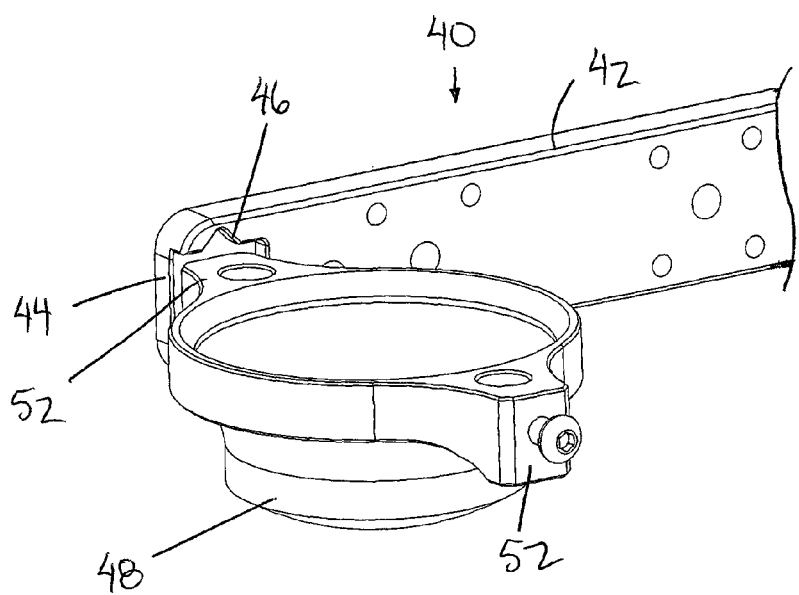
FIG. 5 is a perspective view of the connection between the bowl of the camera support and one of the arms of the camera support.
Figure 6:
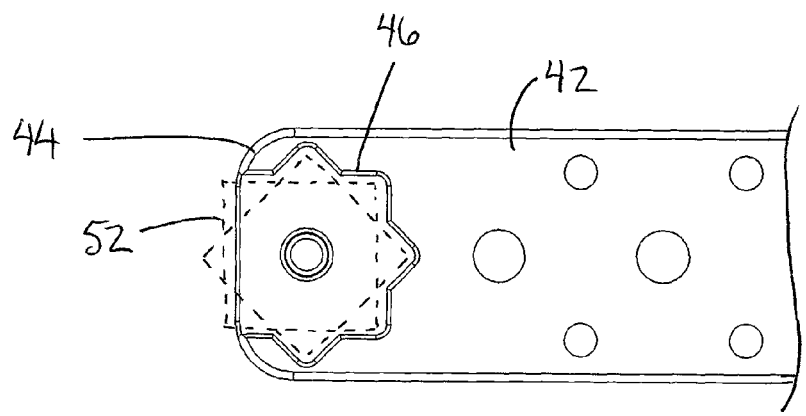
FIG. 6 is a perspective view of the socket on an internal surface of one of the arms of the camera support.
Figure 7:
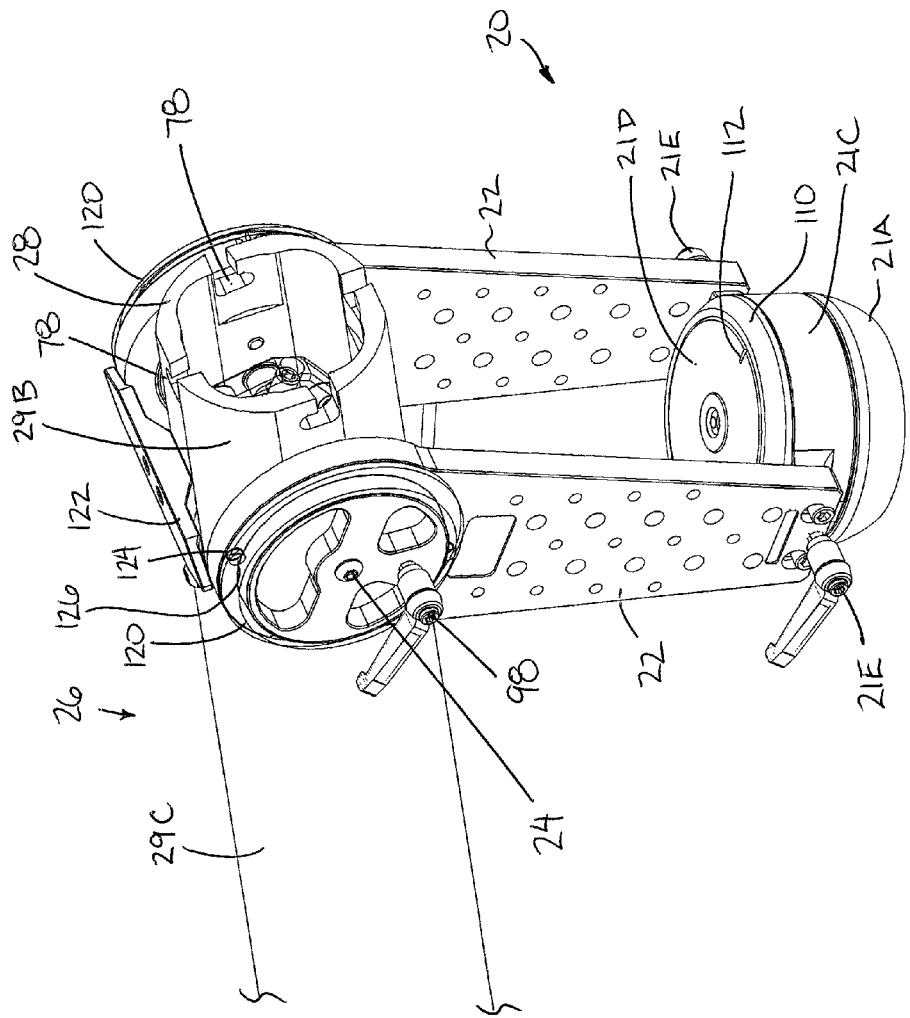
FIG. 7 is a perspective view of the inner end of the camera portion of the jib arm with the balance portion of the jib arm shown removed.
Figure 8:
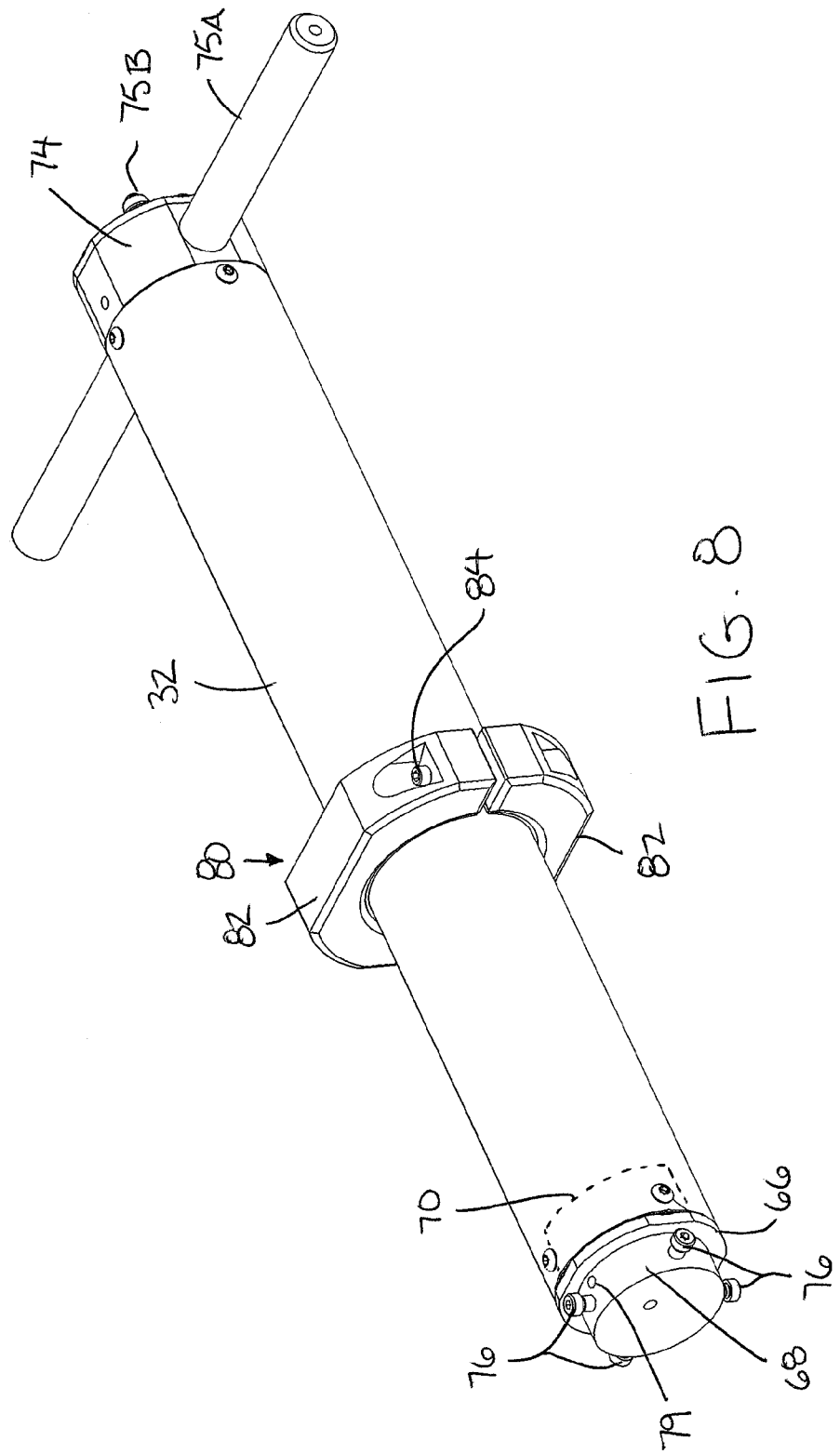
FIG. 8 is a first perspective view of the balance portion of the jib arm shown removed from the camera portion.
Figure 9:
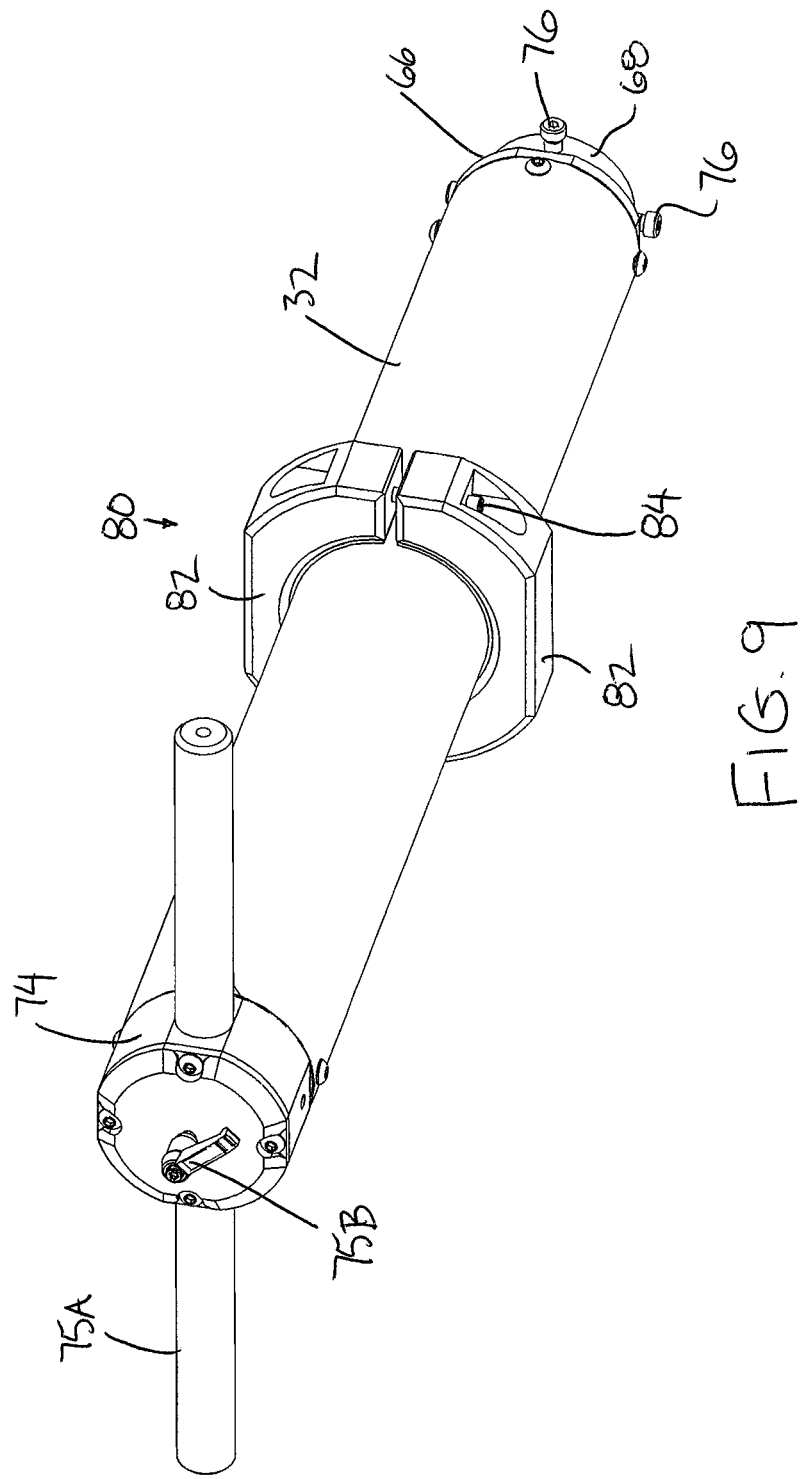
FIG. 9 is a second perspective view of the balance portion of the jib arm shown removed from the camera portion.
Figure 10:
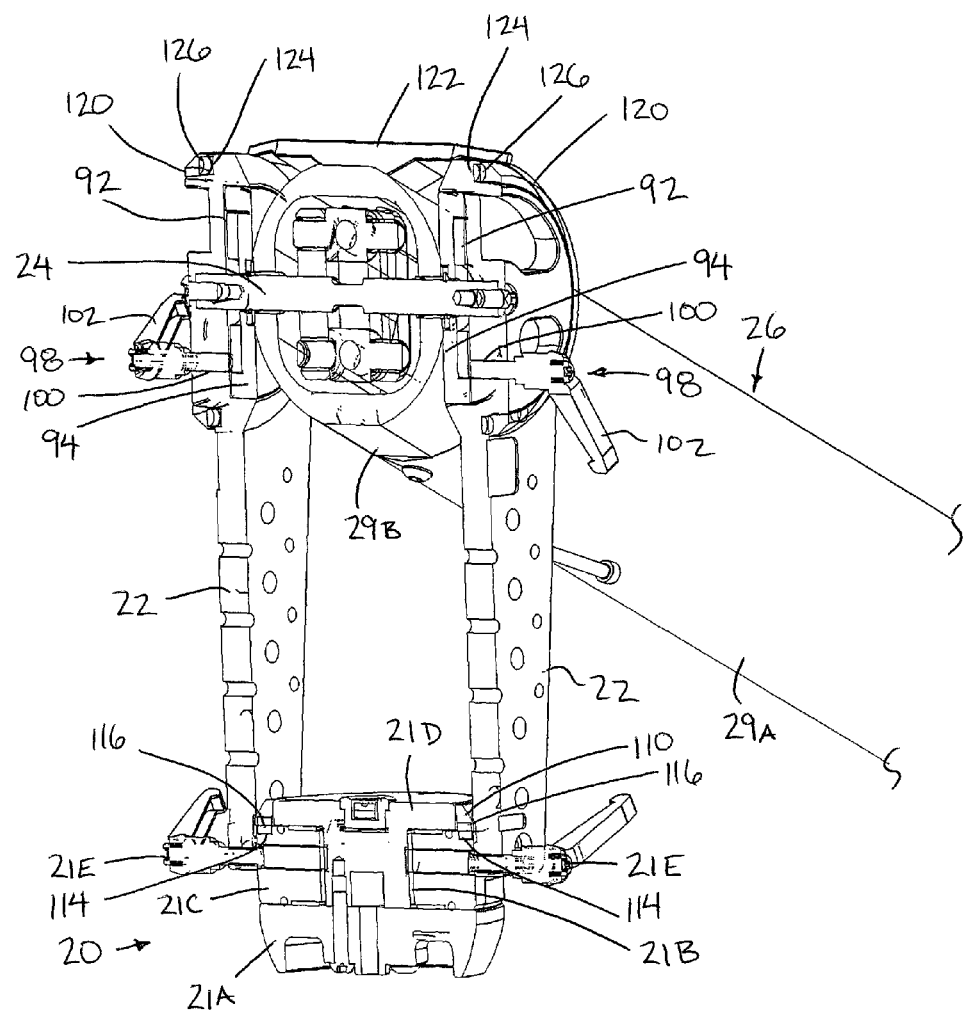
FIG. 10 is a sectional view through the base mount and the jib arm at a vertical plane containing the upright pan axis and the tilt axis defined by the base axle.
Figure 11:
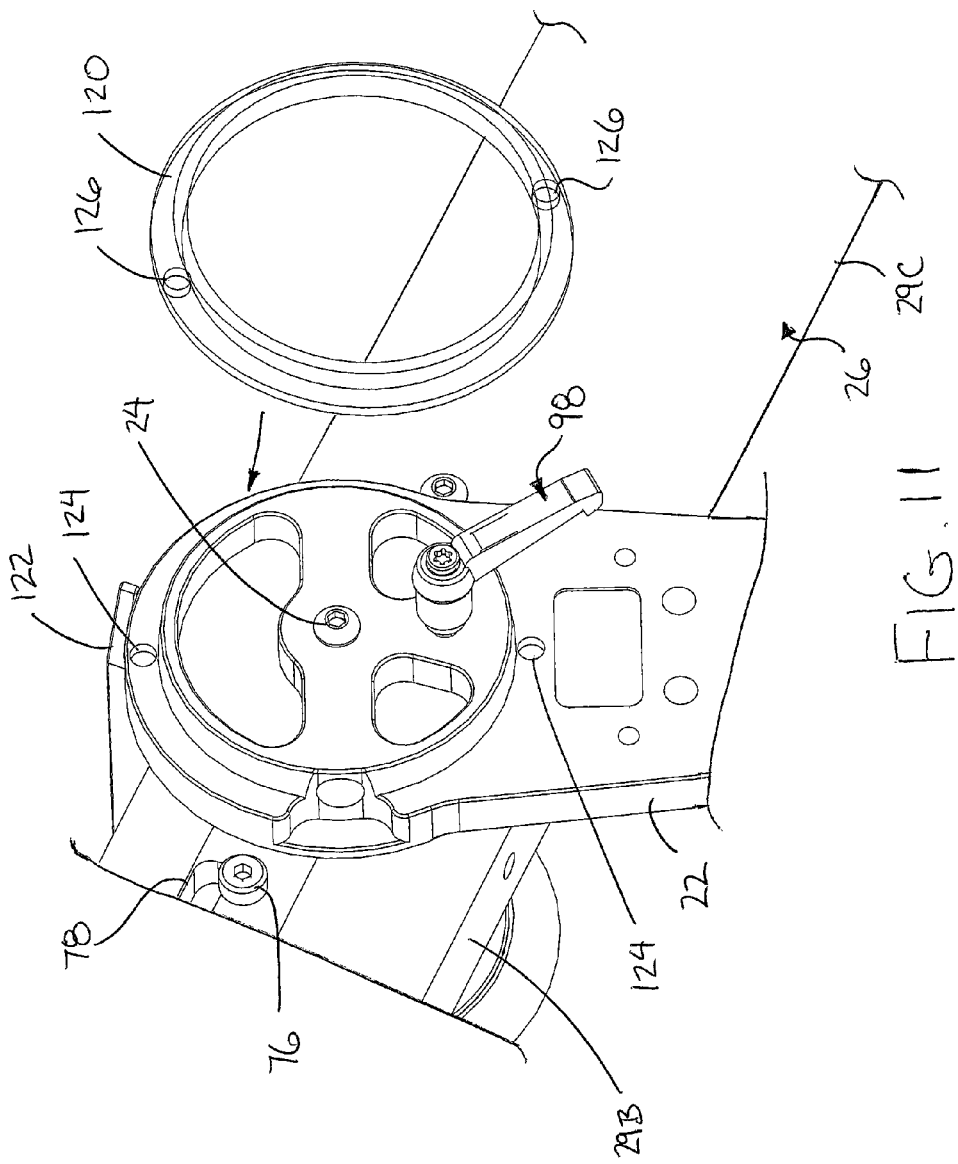
FIG. 11 is a perspective view of one of the indexing rings shown separated from the corresponding base mount.

Referring to the accompanying figures there is illustrated a camera support device generally indicated by reference numeral 10. The device 10 includes a jib arm 12 for supporting a camera, for example a video camera, for movement through an arc shaped path relative to a base 14. The base may comprise a post on a camera dolly or a tri-pod for example.

In the illustrated embodiment the base comprises a tri-pod including a mounting head 16 supported on top of a plurality of legs 18 in the usual manner. The mounting head defines a bowl adjustably receiving a base mount 20 therein.

More particularly, the base mount 20 includes a first lower portion in the form of a ball head 21A which fits in the bowl of the mounting head 16 such that the ball head can be angularly adjusted in any direction relative to the bowl. Typically the ball head is levelled and then clamped at a set position relative to the mounting head. The base mount further includes a shaft portion 21B fixed on the ball head 21A to extend upwardly therefrom to define an upright pan axis of the base mount. A second upper portion 21C in the form of a collar is rotatable about the shaft portion. A retainer flange portion 21D is fixed on the upper end of the shaft portion to retain the collar in the axial direction between the lower portion defined by the ball head 21A below the collar and the flange portion 21D above the collar.

The base mount 20 further includes two ears or mounting plates 22 which are fixed at diametrically opposed positions on the upper portion 21C so as to be rotatable together with the upper portion 21C relative to the lower portion 21A. The two mounting plates 22 extend generally upward from the ball head parallel and spaced apart from one another.

A clamping member 21E is located at each of two diametrically opposed locations on the collar of the upper portion 21C corresponding to the fastening location of the two mounting plates 22. Each clamping member 21C comprises a threaded shaft threaded into a respective bore in the respective mounting plate so as to be radially oriented relative to the upright pan axis in alignment at the inner end with the shaft portion 21B. An external handle on the outer end of the threaded shaft of the clamp member 21E permits a user to engage the clamp member with the shaft portion so that tightening the threaded shaft into the collar selectively fixes the collar relative to the shaft portion to lock the orientation of the jib arm about the upright pan axis at a single selected orientation. The jib arm is readily pivotal about the upright pan axis again when the two clamp members are both released.

Each of the two mounting plates 22 comprises a substantially flat plate including a plurality of mounting apertures of different size and at different spacings relative to one another to permit adjustable mounting of various equipment thereon as well as to permit mounting by fasteners received therethrough to the opposing sides of the rotatable upper portion of the base mount.

The device 10 includes a base axle 24 which is mounted between the two mounting plates 22 at a location spaced upwardly from the ball head 20 such that the base axle is substantially horizontal in orientation and is perpendicular to the two mounting plates once the ball head has been levelled. A level bubble is centrally located on the flange portion 21D of the base mount at the upright pan axis for assisting in levelling the ball head. The jib arm 12 is received between the two mounting plates and includes a mounting aperture for receiving the base axle extending diametrically therethrough such the jib arm 12 is pivotal about the base axle relative to the base.

The jib arm is an elongate hollow tubular member including a camera portion 26 and a balance portion 32. The camera portion spans in a longitudinal direction between a first end 28 forming a camera end of the jib arm and a second end 30 adjacent the mounting plates of the base mount.

The camera portion 32 further includes a first mounting sleeve 29A at the first end 28 of the jib arm, a second mounting sleeve 29B at an inner end of the camera portion for coupling to the balance portion and for pivotal connection to the base axle, and an intermediate tubular portion 29C receiving the first and second mounting sleeves into opposing ends thereof. The mounting sleeves each include a main portion having an outer diameter which is the same as the tubular portion 29 C and a mounting portion of reduced diameter for insertion into the corresponding open end of the tubular portion 29C for connection by threaded fasteners coupled therebetween.

The balance portion 32 spans longitudinally from a first end 34 coupled to the second end of the camera portion to a second end 36 defining a weighted end of the jib arm which is opposite the camera end. The camera portion 26 is longer than the base portion and locates the base axle 24 extending through the second mounting sleeve.

The device 10 also includes a camera axle 38 extending through the first mounting sleeve 29A at the first end 28 of the camera portion so as to be parallel to the base axle and freely pivotal relative to the jib arm. A camera support 40 is fixed to the camera axle such that the camera support and camera axle are pivotal together relative to the jib arm at the camera end thereof.

The camera support includes a frame formed by two arms 42 fixed onto the opposing ends of the camera axle respectively. The two arms are thus positioned spaced apart from one another on opposing sides of the jib arm received therebetween. The two arms are fixed to the ends of the axle to project radially outward from the axle in a common direction towards respective distal ends 44. The inner surfaces of the two distal ends 44 which face one another each form a respective socket 46 therein which mates with corresponding mounts 52 of a bowl 48 forming another component of the camera support 40.

The bowl includes a circular rim arranged to receive the ball head of a camera supporting base therein such that the angular orientation of the ball head can be adjusted in any direction relative to the bowl and clamped at a desired set position. The two mounts 52 of the bowl project diametrically outward from opposing sides for mating connection to the two sockets 46 respectively. The bowl mounts terminate the respective other ends which are square in cross-section for mating with the shape of the sockets 46 at any one of a plurality of different angular orientations about an adjustment axes lying parallel to the base axle and camera axle.

In the illustrated embodiment the socket shape is generally star shaped with eight points defining a sixteen sided polygon permitting the square shape of the base mount to mate therewith at a plurality of different positions offset from one another by 45 degree increments. Each mounting position corresponds to a different angular orientation of the plane of the rim of the bowl 48 relative to the arms. In the illustrations, the rim of the bowl is shown parallel to the arms however the bowl mounts can be interlocked with the sockets at different positions corresponding to the rim of the bowl being inclined at 45 degrees, 90 degrees, 135 degrees or 180 degrees relative to a plane of the two arms 42. At each position, suitable fasteners can be received through the distal ends of the arms for connection to the bowl to fix the orientation of the bowl at the selected interlocked orientation relative to the arms.

The device 10 further includes a parallel link-type linkage 54 coupled between the camera axle and the base axle such that pivotal movement of the camera axle relative to the jib arm is controlled by the linkage to correspond to pivotal movement of the jib arm relative to the base axle. The parallel configuration of the linkage maintains the support arms 42 of the camera support in a substantially horizontal orientation throughout the arcing movement of the camera end of the jib arm relative to the base. The linkage is adjustable to maintain the orientation of the camera support at set inclinations relative to the base throughout the movement of the jib arm.

The linkage includes a first link 56 supported on the camera axle which is fixed relative to the axle and the camera support for pivotal movement therewith relative to the jib arm. Similarly, a second pivot link 58 is coupled to the base axle so as to be fixed relative to that axle and in turn the mounting plates to which the base axle is fixed.

Each of the first and second pivot links comprises two parallel plates mounted in fixed relation to the respective axle at spaced apart locations thereon so as to be parallel and centrally located thereon. A set screw 60 is threaded into each of the plates 59 for fixing the respective plate onto the axle by engagement of the screw onto the axle. Each of the plates 59 extends radially outward from the respective axle to two diametrically opposed ends.

Each pivot link further includes two pivot shafts 62 coupled between the two plates at equal distances at diametrically opposed sides of the respective axle. The pivot shafts are freely pivotal relative to the plates 59 about respective axes which are parallel to the axle. The two pivot shafts are thus each coupled between a corresponding pair of the diametrically opposed ends of the parallel plates 59.

Each pivot shaft 62 of each pivot link is joined by a parallel rod 64 to a corresponding pivot shaft of the other pivot link. The two rods 64 collectively define one parallel member forming one collective link of the linkage 54 which is a four bar parallel linkage comprised of the collective rod member, the jib arm, and the two pivot links. In this manner, the collective parallel rods 64 remain parallel to the longitudinal axis of the jib arm while the two pivot links remain parallel to one another throughout the pivoting motion of the jib arm relative to the base. In this manner, the angular orientation of the camera support remains consistent relative to the base as the camera end of the jib arm is displaced through an arc-like motion about the base axle of the base.

When the balance portion and the camera portion of the jib arm are connected to one another, the two portions define an elongate tube of constant diameter. All of the components of the linkage 54 are received internally within the camera portion of the jib arm such that the linkage remains enclosed within the camera portion of the jib arm in a fully assembled condition even when the balance portion is separated from the camera portion and when the camera portion is separated from the base 14.

The jib arm also includes a first end cap 72 enclosing the first end of the first mounting sleeve 29A at the camera end of the jib arm and second end cap 74 enclosing the weighted end of the jib arm.

The second end cap 74 at the weighted end of the jib arm includes a bore extending therethrough, perpendicularly to the longitudinal axis of the jib arm. A weight mounting post 75A is slidably received through the bore so as to be oriented horizontally and so as to project outwardly from diametrically opposing sides of the jib arm. Annular weights to provide a counterbalance to a camera at the opposing end of the jib arm can then be mounted onto either end of the post and retained thereon using a conventional retaining clamp commonly used with annular weights. A clamp member 75B comprising a threaded shaft is threaded into a respective bore in the end of the end cap 74 in alignment with the bore receiving the post 75A. An external handle on the outer end of the threaded shaft of the clamp member 75B permits a user to engage the clamp member with the post internally within the end cap so that tightening the threaded shaft into the end cap selectively retain the weight mounting post fixed to the jib arm in a working position for mounting weights thereon. The weight mounting post is readily removable by sliding out from the bore in the jib arm when the clamp member is released for storage and transport as desired.

To connect the camera portion and the balance portion of the jib arm, a mounting collar 66 is provided including a first portion 68 received within the open end of the second mounting sleeve 29B at the second end of the camera portion and a second portion 70 received with the first end of the balance portion. In each instance, the outer diameter of the collar closely fits within the inner diameter of the respective portion of the jib arm such that radially extending fasteners can be mounted through the jib arm into the collar to mount the components relative to one another.

The camera portion and balance portion of the jib arm are detached from one another by maintaining the mounting collar 66 fixed within the first end of the balance portion so as to comprise part of the balance portion when the balance portion and camera portion are separated. The first portion of the mounting collar is thus readily releasable from the second end of the camera portion. The fasteners used at this releasable connection are threaded into the first portion of the mounting collar at circumferentially spaced positions to project outwardly therefrom and define mounting studs 76. A plurality of L-shaped mounting slots 78 are formed in the second end of the camera portion so as to be aligned with the studs 76 respectively.

Attachment is accomplished by axially sliding the studs into a first portion of the slot 78 and then rotating the base portion relative to the camera portion about the longitudinal axis thereof until the studs reach the terminal ends of second portions of the respective mounting slots where frictional engagement between the two portions of the jib arm retain the two portions in the mounted configuration.

The portion of the mounting collar 66 locating the studs 76 therein further includes a locking aperture 79 which is arranged to be aligned with one of the slots 78 in the coupled position. In this instance a locking pin can be received through the locking aperture and the corresponding slot to retain the jib arm in the coupled position by resisting the relative rotation required to release the studs from the slots. An ideal locking pin is an Allen key used for tightening various fasteners of the jib arm.

The reverse operation of rotating the balance portion relative to the camera portion and then axially sliding the balance portion relative to the camera portion permits the two portions of the jib arm to be separated.

Releasing the ball head from the bowl of the base structure permits the camera portion of the jib arm to be separated from the base structure.

The balance portion of the jib arm includes a trim weight 80 in the form of a generally annular collar having an internal diameter which closely receives the external diameter of the balance portion of the jib arm therein. The trim weight is slidable in the direction of the longitudinal axis of the jib arm between the opposing first and second ends of the balance portion between the mounting collar 66 and the end cap 74.

The trim weight 80 is formed of two semi-circular sections 82, each extending partway about the circumference of the jib arm. Fasteners 84 are coupled between the ends of the two sections 82 to function as clamps which permit the trim weight to be selectively clamped about the jib arm to fix the trim weight relative to the jib arm at a selected longitudinal position.

The weight mountings post 75A permits conventional weights to be stacked thereon for substantially counterbalancing weight of a camera supported at the camera end of the jib arm. Once the camera has been substantially counterbalanced with weights placed on the mounting post, the trim weight 80 is manually adjusted in position to more precisely counterbalance the weight of the camera. The trim weight is collectively detached from the camera portion of the jib arm with the balance portion when disassembled for transport.

To fix the jib arm at a desired angular orientation relative to the base, a brake assembly is provided at the base axle. Both mounting plates 22 in this instance include a recessed pocket 92 formed in the inner surface about the base axle for receiving a brake disc 94 therein. The brake discs are fastened to the jib arm such that the discs 94 are fixed to the jib arm and pivotal together with the jib arm about the base axle. Two brake members 98 are mounted externally on the respective mounting plates 22 for alignment with the respective brake disc 94. Each brake member includes a threaded shaft 100 which is threaded through the mounting plate 22. A gripping portion 102 is mounted on the external end of the shaft 100 to permit gripping by a person such that a person can manually rotate the threaded shaft. Rotating the threaded shaft 100 in a tightening direction causes the shaft to be clamped into frictional engagement against the respective brake disc to frictionally fix the disc relative to the brake member. In this manner, the jib arm fixed to the brake discs is effectively fixed relative to the base mount supporting the brake members 98 therein. Varying the tension of the screw threaded into the clamping portion permits different degrees of friction to be applied to the relative movement between the brake disc and the brake member for only partially braking and resisting the movement of the jib arm relative to the base mount if desired.

Indexing is provided for both the panning movement about the upright pan axis of the base mount and the tilting movement about the horizontal axis defined by the base axle 24 about which the jib arm is pivotal relative base mount.

More particularly, an indexing ring 110 is mounted in fixed relation onto the top end of the collar defining the shaft portion 21B such that the ring 110 surrounds the flange portion 21D. The indexing ring is an annular member which is concentric with the upright pan axis. Indexing markers 112 in the form of notches in the periphery of the flange portion 21D are adjacent to the indexing ring and provide a point of reference to gauge rotation of the ring and jib arm relative to the markers on the flange portion fixed to the base structure. The user can place their own various markings on the indexing ring for rotation with the ring relative to the markers 112 to mark starting and ending positions of a prescribed panning movement for example.

First magnetic couplings 114 are fixed into respective recesses in the upper surface of the flange portion 21D for magnetic attraction to respective second magnetic couplings 116 within the indexing ring at diametrically opposed locations. The indexing ring is solely retained by magnetic attraction between the couplings so that the indexing ring is readily separable and interchangeable with another indexing ring of like configuration having different user markings thereon as desired.

Indexing of the tilting movement is provided by a pair of indexing rings 120 mounted in fixed relation onto respective ones of the two mounting plates 22 so as to be concentric with the base axle. A corresponding indexing marker 122 is mounted on the top side of the jib arm to protrude laterally outwardly in both directions overtop of the two mounting plates 22 respectively. An upper end of each mounting plate 22 has a radius of curvature centred on the base axle with the same radius as the indexing ring so that as the jib arm pivots, the indexing marker 122 moves in an arc along the upper edge of the corresponding mounting plate about the periphery of the two indexing rings 122. The user can thus also place their own various markings on the indexing rings 122 relative to which the markers 122 are rotated to mark starting and ending positions of a prescribed tilting movement for example. First magnetic couplings 124 are fixed into respective recesses in the mounting plates 22 for magnetic attraction to respective second magnetic couplings 126 within the indexing ring at diametrically opposed locations. The indexing rings are thus arranged to be solely retained by magnetic attraction between the couplings so that the indexing rings 122 are also readily separable and interchangeable with other indexing rings of like configuration having different user markings thereon as desired. The indexing rings for panning and tilting are also interchangeable with one another.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A camera supporting device for supporting a camera for movement through an arc-shaped path relative to a base structure, the device comprising:
    a base mount arranged for connection to the base structure;
    a camera mount arranged for supporting the camera thereon;
    a jib arm extending in a longitudinal direction between a camera end and a weighted end; and
    a linkage connecting the camera mount to the base mount, the linkage comprising:
        a first axle pivotally coupled to the jib arm adjacent the camera end for relative pivotal movement about a first axis and being coupled to the camera mount in fixed relation thereto;
        a first pivot link fixed to the first axle for pivotal movement therewith relative to the jib arm;

a second axle fixed to the base mount and pivotally supporting the jib arm thereon about a second axis parallel to the first axis;

a second pivot link fixed to the second axle;

a rod member comprising a first parallel rod pivotally coupled at a first end on the first pivot link spaced from the first axle and pivotally coupled at a second end on the second pivot link spaced from the second axle so as to be in parallel relationship with the jib arm such that the camera mount is pivotal relative to the jib arm corresponding to pivotal movement of the jib arm relative to the base structure; and a second parallel rod pivotally coupled at a first end of the first pivot link spaced from the first axle and pivotally coupled at a second end on the second pivot link spaced from the second axle so as to be in parallel relationship with the jib arm;

wherein the first and second parallel rods are pivotally coupled on the first and second pivot links respectively at diametrically opposed locations about the respective axles relative to one another;

wherein the jib arm comprises a tubular member; and wherein the first pivot link, the second pivot link, the first parallel rod, and the second parallel rod are fully received within the tubular member forming the jib arm.

2. The device according to claim 1 further comprising a brake disc fixed on the jib arm for pivotal movement therewith relative to the base mount and a brake member supported on the base mount so as to be arranged for adjustably engaging the brake disc to apply a braking force resisting pivotal movement of the jib arm relative to the base mount.

3. The device according to claim 2 wherein the brake member comprises a screw member arranged to apply an adjustable braking force to resist pivotal movement of the jib arm relative to the base mount.

4. The device according to claim 1 further comprising a trim weight supported on the jib arm in proximity to the weighted end for sliding movement relative to the jib arm in the longitudinal direction wherein the trim weight comprises a collar supported about the jib arm which is arranged to be selectively clamped about the jib arm to fix the trim weight relative to the jib arm.

5. The device according to claim 1 further comprising a counterweight supported on the jib arm in proximity to the weighted end, wherein the jib arm comprises:

a camera portion extending in the longitudinal direction between a first end at the camera end of the jib arm and a second end, the camera portion fully supporting the linkage thereon such that the base axle is adjacent to the second end; and a balance portion extending in the longitudinal direction between a first end coupled to the second end of the camera portion and a second end at the weighted end of the jib arm, the balance portion fully supporting the counterweight thereon; and wherein the balance portion and counterweight supported thereon are readily separable from the camera portion and the linkage supported thereon.

6. The device according to claim 1 further comprising a counterweight supported on the jib arm in proximity to the weighted end, wherein the camera mount includes a frame portion fixed to the camera axle and a bowl mount arranged to adjustably support a ball head therein, wherein the bowl mount is arranged to be coupled to the frame portion in a plurality of different interlocked positions which are angularly offset from one another about an axis oriented parallel to the camera axle, and wherein a portion of the bowl mount is interlocked with a portion of the frame portion in each of the different interlocked positions.

7. The device according to claim 1 wherein the jib arm includes a bore extending therethrough adjacent to the weighted end which slidably receives a weight mounting post therein, and wherein there is provided a clamp member mounted on the jib arm arranged to selectively retain the weight mounting post fixed to the jib arm in a working position for mounting weights thereon, the weight mounting post being readily slidably removable from the bore in the jib arm when the clamp member is released.

8. The device according to claim 1 wherein the base mount comprises a first portion arranged to be fixed relative to the base structure, a second portion which is rotatable relative to the first portion about an upright pan axis, an indexing marker supported on one of the first and second portions, and an indexing ring supported on the other one of the first and second portions concentrically with the upright pan axis for pivotal movement relative to the indexing marker, the indexing ring being magnetically retained on the respective portion of the base mount so as to be readily separable and interchangeable with another indexing ring of like configuration.

9. The device according to claim 1 further comprising an indexing marker supported on one of the jib arm and the base mount and an indexing ring supported on the other one of the jib arm and the base mount concentrically with the second axle for pivotal movement relative to the indexing marker, the indexing ring being magnetically retained on the respective one of the jib arm and the base mount so as to be readily separable and interchangeable with another indexing ring of like configuration.

10. A camera supporting device for supporting a camera for movement through an arc-shaped path relative to a base structure, the device comprising:

a base mount arranged for connection to the base structure;

a camera mount arranged for supporting the camera thereon;

a jib arm extending in a longitudinal direction between a camera end and a weighted end;

a linkage including a base axle pivotally supporting the jib arm on the base mount at an intermediate location between the camera end and the weighted end and a camera axle pivotally coupled to the jib arm adjacent the camera end and supporting the camera mount in fixed relation thereon, the linkage connecting the camera mount to the base mount such that the camera mount is pivotal relative to the jib arm corresponding to pivotal movement of the jib arm relative to the base mount; and a counterweight supported on the jib arm in proximity to the weighted end;

wherein the jib arm comprises:

a camera portion extending in the longitudinal direction between a first end at the camera end of the jib arm and a second end, the camera portion fully supporting the linkage thereon such that the base axle is adjacent to the second end of the camera portion; and a balance portion extending in the longitudinal direction between a first end coupled to the second end of the camera portion and a second end at the weighted end of the jib arm, the balance portion fully supporting the counterweight thereon; and wherein the balance portion and counterweight supported thereon are readily separable from the camera portion and the linkage which is fully supported on the camera portion.

11. The device according to claim 10 wherein one of the camera portion and the balance portion includes circumferentially spaced apart studs extending radially outward therefrom and the other one of the camera portion and the balance portion includes circumferentially spaced apart generally L-shaped slots arranged to mating receive respective ones of the studs therein in a coupled position of the camera portion and the balance portion.

12. The device according to claim 11 wherein the portion locating the studs therein further comprises a locking aperture arranged for alignment with one of the slots in the other portion in the coupled position so as to be arranged to receive a locking pin through locking aperture and corresponding slot to retain the jib arm in the coupled position.

13. The device according to claim 10 wherein the camera portion and the balance portion each comprise an elongate tubular member in which the tubular members have a common diameter.

14. The device according to claim 13 wherein the linkage is wholly received within the tubular member of camera portion.

15. A camera supporting device for supporting a camera for movement through an arc-shaped path relative to a base structure, the device comprising:
    a base mount arranged for connection to the base structure;
    a camera mount arranged for supporting the camera thereon;
    a jib arm extending in a longitudinal direction between a camera end and a weighted end;
    a linkage including a base axle pivotally supporting the jib arm on the base mount at an intermediate location between the camera end and the weighted end and a camera axle pivotally coupled to the jib arm adjacent the camera end and supporting the camera mount in fixed relation thereon, the linkage connecting the camera mount to the base mount such that the camera mount is pivotal relative to the jib arm corresponding to pivotal movement of the jib arm relative to the base mount; and
    a counterweight supported on the jib arm in proximity to the weighted end;
    wherein the camera mount includes a frame portion fixed to the camera axle and a bowl mount arranged to adjustably support a ball head therein;
    wherein the bowl mount is arranged to be coupled to the frame portion in a plurality of different interlocked positions which are angularly offset from one another about an axis oriented parallel to the camera axle; and
    wherein a portion of the bowl mount is interlocked with a portion of the frame portion in each of the different interlocked positions.

16. The device according to claim 15 wherein the frame portion comprises a pair of arms fixed to the camera axle at opposing ends thereof and the bow mount comprises a pair of diametrically opposed protrusions arranged to be interlocked with respective ones of the arms in the different interlocked positions.

17. The device according to claim 16 wherein the axis about which bowl mount is angularly adjustable extends through the diametrically opposed protrusions.

18. The device according to claim 16 wherein the protrusions have a first shape and wherein sockets are provided on the arms having a second shape arranged to matingly receive the first shape therein in each of the different interlocked positions which are angularly offset from one another.

19. A camera supporting device for supporting a camera for movement through an arc-shaped path relative to a base structure, the device comprising:
    a base mount arranged for connection to the base structure;
    a camera mount arranged for supporting the camera thereon;
    a jib arm extending in a longitudinal direction between a camera end and a weighted end; and
    a linkage connecting the camera mount to the base mount, the linkage comprising:
        a first axle pivotally coupled to the jib arm adjacent the camera end for relative pivotal movement about a first axis and being coupled to the camera mount in fixed relation thereto;
        a first pivot link fixed to the first axle for pivotal movement therewith relative to the jib arm;
        a second axle fixed to the base mount and pivotally supporting the jib arm thereon about a second axis parallel to the first axis;
        a second pivot link fixed to the second axle; and
        a rod member pivotally coupled at a first end on the first pivot link spaced from the first axle and pivotally coupled at a second end on the second pivot link spaced from the second axle so as to be in parallel relationship with the jib arm such that the camera mount is pivotal relative to the jib arm corresponding to pivotal movement of the jib arm relative to the base structure;
    a brake disc fixed on the jib arm for pivotal movement therewith relative to the base mount;
    a brake member supported on the base mount so as to be arranged for adjustably engaging the brake disc to apply a braking force resisting pivotal movement of the jib arm relative to the base mount, the brake member comprising a screw member arranged to apply an adjustable braking force to resist pivotal movement of the jib arm relative to the base mount.

20. A camera supporting device for supporting a camera for movement through an arc-shaped path relative to a base structure, the device comprising:
    a base mount arranged for connection to the base structure;
    a camera mount arranged for supporting the camera thereon;
    a jib arm extending in a longitudinal direction between a camera end and a weighted end; and
    a linkage connecting the camera mount to the base mount, the linkage comprising:
        a first axle pivotally coupled to the jib arm adjacent the camera end for relative pivotal movement about a first axis and being coupled to the camera mount in fixed relation thereto;
        a first pivot link fixed to the first axle for pivotal movement therewith relative to the jib arm;
        a second axle fixed to the base mount and pivotally supporting the jib arm thereon about a second axis parallel to the first axis;
        a second pivot link fixed to the second axle; and
        a rod member pivotally coupled at a first end on the first pivot link spaced from the first axle and pivotally coupled at a second end on the second pivot link spaced from the second axle so as to be in parallel relationship with the jib arm such that the camera mount is pivotal relative to the jib arm corresponding to pivotal movement of the jib arm relative to the base structure;

the base mount further comprising:
a first portion arranged to be fixed relative to the base structure;
a second portion which is rotatable relative to the first portion about an upright pan axis;
an indexing marker supported on one of the first and second portions; and
an indexing ring supported on the other one of the first and second portions concentrically with the upright pan axis for pivotal movement relative to the indexing marker, the indexing ring being magnetically retained on the respective portion of the base mount so as to be readily separable and interchangeable with another indexing ring of like configuration.

* * * * *